US011530514B2

(12) United States Patent
Ahola et al.

(10) Patent No.: US 11,530,514 B2
(45) Date of Patent: Dec. 20, 2022

(54) METHOD FOR MANUFACTURING A FIBROUS WEB

(71) Applicant: Kemira Oyj, Helsinki (FI)

(72) Inventors: Juhana Ahola, Espoo (FI); Marko Kolari, Vantaa (FI)

(73) Assignee: Kemira Oyj, Helsinki (FI)

( * ) Notice: Subject to any disclaimer, the term of this patent is extended or adjusted under 35 U.S.C. 154(b) by 240 days.

(21) Appl. No.: 16/758,058

(22) PCT Filed: Nov. 8, 2018

(86) PCT No.: PCT/FI2018/050821
§ 371 (c)(1),
(2) Date: Apr. 22, 2020

(87) PCT Pub. No.: WO2019/092317
PCT Pub. Date: May 16, 2019

(65) Prior Publication Data
US 2021/0189646 A1 Jun. 24, 2021

(30) Foreign Application Priority Data
Nov. 9, 2017 (FI) .................................... 20176002

(51) Int. Cl.
| | | |
|---|---|---|
| *D21H 17/11* | (2006.01) | |
| *D21C 5/00* | (2006.01) | |
| *A01N 47/44* | (2006.01) | |
| *A01N 59/00* | (2006.01) | |
| *C02F 1/50* | (2006.01) | |
| *D21H 17/66* | (2006.01) | |
| *D21H 21/24* | (2006.01) | |
| *D21H 21/36* | (2006.01) | |
| *C02F 103/28* | (2006.01) | |

(52) U.S. Cl.
CPC ............. *D21C 5/005* (2013.01); *A01N 47/44* (2013.01); *A01N 59/00* (2013.01); *C02F 1/50* (2013.01); *D21H 17/11* (2013.01); *D21H 17/66* (2013.01); *D21H 21/24* (2013.01); *D21H 21/36* (2013.01); *C02F 2103/28* (2013.01); *C02F 2303/04* (2013.01)

(58) Field of Classification Search
CPC ........ D21H 17/07; D21H 17/11; D21H 17/66; D21H 17/56; D21H 21/36; D21H 17/45; D21H 21/24; A01N 47/44; A01N 59/00; C02F 1/50; C02F 2303/04; C02F 2103/28; D21C 5/005; D21C 5/00
USPC ....................................................... 162/161
See application file for complete search history.

(56) References Cited

U.S. PATENT DOCUMENTS

| | | |
|---|---|---|
| 4,725,623 A | 2/1988 | Whitekettle et al. |
| 5,041,463 A | 8/1991 | Whitekettle et al. |
| 5,128,133 A | 7/1992 | Hidaka et al. |
| 5,700,834 A | 12/1997 | Stinavage |
| 6,656,919 B1 | 12/2003 | Baugh et al. |

FOREIGN PATENT DOCUMENTS

| | | |
|---|---|---|
| EA | 019646 B1 | 5/2014 |
| EP | 0255239 A1 | 2/1988 |
| EP | 0760206 A2 | 3/1997 |
| FI | 20165408 A | 11/2017 |
| GB | 1091049 | 11/1967 |
| JP | S44032005 | 12/1969 |
| JP | H03218305 A | 9/1991 |
| JP | H09165306 A | 6/1997 |
| JP | 2003531973 A | 4/2001 |
| JP | 2016509002 A | 3/2016 |
| JP | 2016509003 A | 3/2016 |
| JP | 2016510330 A | 4/2016 |
| RU | 2555911 C2 | 7/2015 |
| WO | 9614092 A1 | 5/1996 |
| WO | 0153216 A1 | 7/2001 |
| WO | 0166471 A2 | 9/2001 |
| WO | 0183886 A1 | 11/2001 |
| WO | 2010000744 A1 | 1/2010 |
| WO | 2014121302 | 2/2014 |
| WO | 2014114851 A1 | 7/2014 |

(Continued)

OTHER PUBLICATIONS

Luo, M. et al.: Chemical insights into dodecylamine spore lethal germination. Chemical Science. 2014, vol. 5, Nr 8, p. 3320-3324, whole document.
Finnish Patent and Registration Office, Search report of FI20176002, dated May 8, 2018, 2 pages.
Search report for corresponding Russian application 2020118738 dated Jan. 25, 2022; 4 pages.
Japanese office action and English translation thereof related to corresponding Japanese application No. JP2020-544162; dated Jun. 14, 2022; 6 pages.

*Primary Examiner* — Mark Halpern
(74) *Attorney, Agent, or Firm* — Meunier Carlin & Curfman LLC

(57) ABSTRACT

A method for manufacturing a fibrous web, such as web of paper, board, tissue or the like is disclosed. The method includes obtaining at least one fibre suspension of lignocellulosic and/or cellulosic fibres and feeding the fibre suspension into an intermediate residence entity. The fibre suspension including bacterial endospores, is discharged out of the intermediate residence entity via an outlet after a residence time of at least 2 hours in the intermediate residence entity and after a time delay the fibre suspension is formed into a fibrous web. Bacterial endospores are sensitized by adding a germinant surfactant including a primary or secondary ammonium head group and a linear unsubstituted C12-alkyl tail, to the fibre suspension at an addition point located at a lower part of the intermediate residence entity or after the outlet of the intermediate residence entity, but before the formation of the fibrous web.

30 Claims, 1 Drawing Sheet

(56) References Cited

FOREIGN PATENT DOCUMENTS

| | | |
|---|---|---|
| WO | 2014121301 A | 8/2014 |
| WO | 2017194842 A1 | 11/2017 |

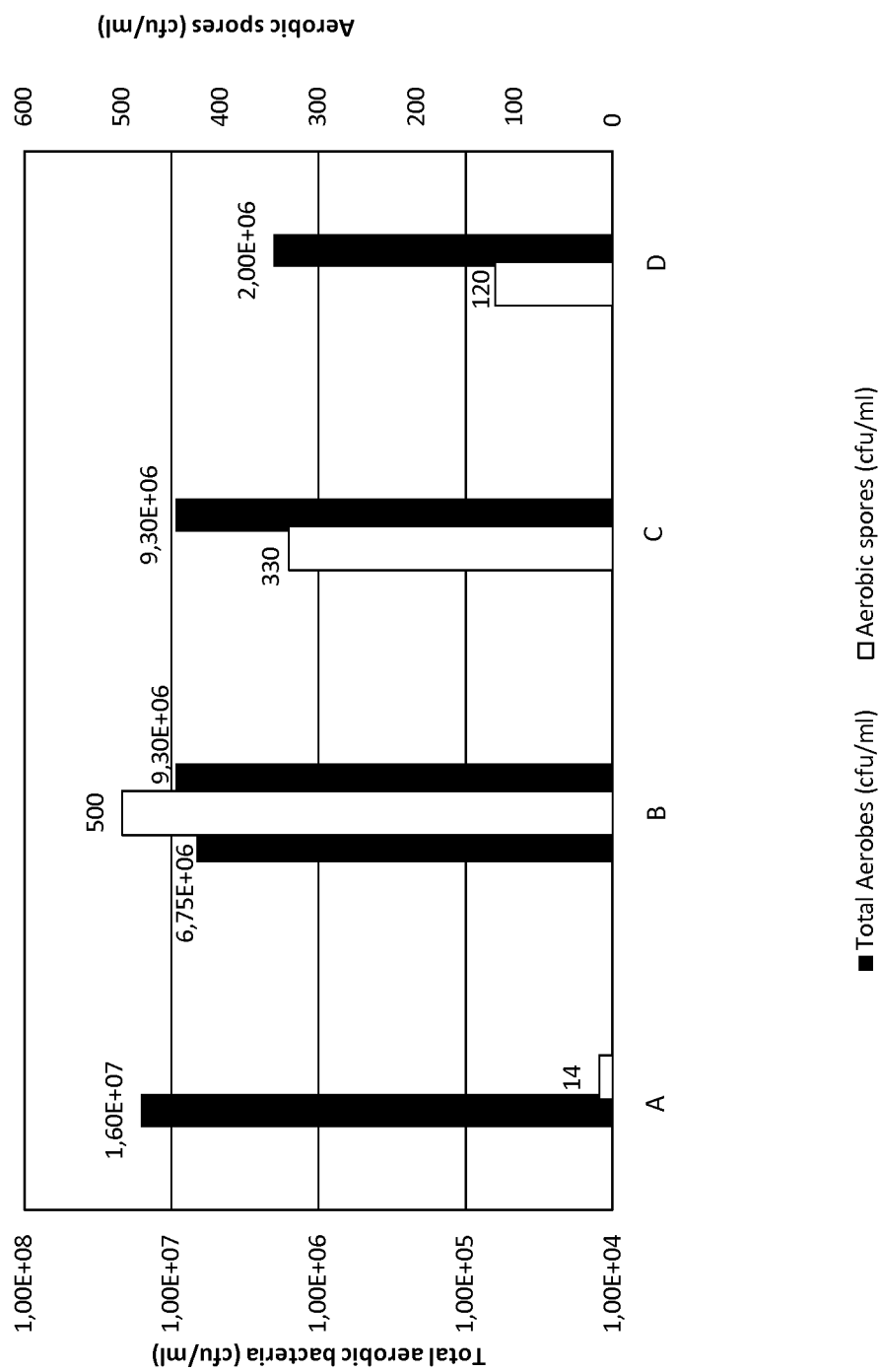

METHOD FOR MANUFACTURING A FIBROUS WEB

This application is a U.S. national application of the international application number PCT/FI2018/050821 filed on Nov. 8, 2018 and claiming priority of Finnish application 20176002 filed on Nov. 9, 2017 the contents of all of which are incorporated herein by reference.

The present invention relates to a method for manufacture of fibrous web according to the preambles of enclosed independent claims.

Bacterial cells are normally present in aqueous environments of pulp mills as well as paper, board and tissue mills. Bacterial growth in the process is commonly monitored and limited by using various measures, e.g. by feeding of biocides into the process flows. There are also many other ways to destroy or kill vegetative bacterial cells. For example, in manufacture of paper and board the vegetative bacteria are destroyed also by heat in the drying section of a paper or board machine. However, some bacterial cells form endospores, which are highly resistant to common destruction methods effective for vegetative bacteria, such as heat, disinfectants, chemical biocides, desiccation, ultraviolet light and ionizing radiation. The endospores may remain viable but dormant for prolonged periods, even for years, until the external conditions become favourable, after which a transformation, i.e. germination, of bacterial endospores into vegetative bacteria takes place.

The amount of endospores in the final paper or board product may be a problem, especially if the product is intended for hygiene purposes, food packaging or beverage packaging. Consequently there is an interest in the paper and board production to reduce not only the amount of vegetative bacteria but also the dormant endospores.

Problems are often encountered when there is a production stop, either planned or unplanned, at the paper or board mill. Pulp is stored in large storage towers, and during the production stop, the conditions in storage towers may change in a manner that promotes formation of endospores. During the production stop it is hard or impossible to feed biocide into the storage tower, at least so that the whole pulp volume inside the tower could be treated. Furthermore, the large size of the storage towers may lead to inadequate mixing and/or formation of poorly mixed zones inside the tower, even during normal production conditions. After the storage tower, especially after a production stop, the pulp may contain too much endospores, which means that the produced paper or board does not meet the quality requirements and must be sold at lower price or completely discarded. In addition to storage towers, bacterial endospores may cause problems in other process stages with long residence times, for example in pulpers for pulp and broke. Consequently, there is a need for a solution that would enable effective endospore control immediately after process stages with long residence times, especially after pulper(s) and/or the storage tower(s).

There are suggestions to control of spore forming bacteria by nutrient triggered germination. Germinating agents that function as nutrients, such as L-alanine, are added to the system and should induce the germination of endospores by creating a non-hostile environment. The germination requires some delay and the germinated endospores would thereafter be destroyed by conventional biocides. In practice, however, addition of germinating agents that function as nutrients to a process, especially with closed or nearly-closed water circulation, leads easily to over-nutrification of the whole system, inducing excessive microbial activity that increases risks for all kind of microbiological issues, such as slime formation on machinery or formation of malodours. Prevention of these consequences would require increasing biocide dosages. Nutrient triggered germination has thus not become a realistic option in industrial systems with closed or nearly-closed water circulations and/or complex microbial environment.

An object of this invention is to minimise or possibly even eliminate the disadvantages existing in the prior art.

Another object of the present invention is to provide an effective method for quantitatively reducing bacterial endospores in the aqueous environment of pulp mill, paper mill or board mill, especially after the storage tower or the like or after a production stop.

A further object of the present invention is to effectively sensitise the bacterial endospores for obliteration in the aqueous environment of pulp mill, paper mill or board mill.

These objects are attained with the invention having the characteristics presented below in the characterising parts of the independent claims.

Some preferred embodiments of the invention are presented in the dependent claims.

The features recited in the dependent claims and the embodiments in the description relate, whenever applicable, both to the method as well as to the treatment system, even if not always explicitly stated so.

In a typical method according to the present invention for manufacturing a fibrous web, such as web of paper, board, tissue or the like, the method comprises
(a) obtaining at least one fibre suspension of lignocellulosic and/or cellulosic fibres,
(b) feeding the fibre suspension into an intermediate residence entity, such as pulper, storage tower or broke tower,
(c) discharging fibre suspension, which comprises bacterial endospores, out of the intermediate residence entity via an outlet after a residence time of at least 2 hours in the intermediate residence entity,
(d) forming after a time delay the fibre suspension into the fibrous web,
wherein
bacterial endospores are sensitised for germination by adding a germinant surfactant, which comprises a primary or secondary ammonium head group and a linear unsubstituted C12-alkyl tail, to the fibre suspension at an addition point, which is located at the lower part of the intermediate residence entity or after the outlet of the intermediate residence entity, but before the formation of the fibrous web.

Typical treatment system for sensitising bacterial endospores in a manufacture of a fibrous web, such as web of paper, board, tissue or the like, comprises
  a germinant surfactant, which comprises a primary or secondary ammonium head group and a linear unsubstituted C12-alkyl tail, and
  at least one biocidal agent.

Now it has been surprisingly found that a germinant surfactant, which comprises a primary or secondary ammonium head group and linear unsubstituted C12-alkyl tail, as well as treatment systems comprising such germinant surfactant, effectively interacts with endospores and sensitises them by disrupting their outer protective structure in a pulp suspension, even when the germinant surfactant is added relatively short time before the web formation. It was highly unexpected that the germinant surfactant is able to effectively sensitise endospores in a complex environment comprising fibres, optionally organic and inorganic additives, such as various papermaking chemicals and mineral fillers. The germinant surfactant is able, during short period of time that lapses between the intermediate residence entity and the following process stage, to sensitise endospores in a manner that transforms them into form in which they can be easily destroyed, either by using a biocidal agent, heat or by the germinant surfactant itself. The present invention thus enables manufacture of hygienic paper or board even from an endospore-containing pulp suspension.

In the present context the term "germinant surfactant" denotes generally a compound that comprises a primary or secondary ammonium head group and a linear unsubstituted alkyl tail. The germinant surfactant is able to disrupt the protective outer structure of an endospore and subjects its core to the biocidal agents and/or heat. The germinant surfactant is thus non-nutrient germinant. The germinant surfactant shows also a biocidal effect itself, i.e. the germinant surfactant itself, in suitable concentration, is able to destroy endospores and leave them unviable. According to one preferable embodiment of the invention the germinant surfactant is selected from n-dodecylamine, n-dodecylguanidine, dodecylamine salt, dodecylguanidine salt or any of their mixtures, more preferably n-dodecylamine or dodecylguanidine salt, such as dodecylguanidine hydrochloride or dodecylguanidine acetate. Even more preferably the germinant surfactant may be n-dodecylamine or dodecylguanidine hydrochloride.

The addition of the germinant surfactant to the fibre suspension of lignocellulosic and/or cellulosic fibres does not increase the amount of nutrients suitable for microbial consumption in the suspension. In this way the addition of the germinant surfactant does not increase the risk for heightened microbial activity in general.

The germinant surfactant may be added, either alone or as a component of the treatment system, in amount of >30 ppm, preferably >50 ppm, more preferably >60 ppm, given as active surfactant, to the fibre suspension which contains bacterial endospores. According to one embodiment the germinant surfactant may be added in amount that is in the range of 30-220 ppm, preferably 60-200 ppm, more preferably 70-100 ppm, given as active surfactant, to the fibre suspension which contains bacterial endospores. The germinant surfactant can be added in relatively low dosage levels, which is beneficial for both economic and technical reasons. In this manner, for example, foaming problems and interference with other papermaking chemicals may be avoided. Furthermore, low dosage level may ensure minute or insignificant amounts of germinant surfactant in the final product which may be a prerequisite for certain hygienic product grades such as food packaging board.

In the present context the term "intermediate residence entity" may be any pulp, water or broke storage tower or tank or corresponding entity in manufacture of pulp, paper, board, tissue or like, which entity has a residence time of at least two hours. Preferably the intermediate residence entity is pulp tower, water tank, broke storage tower or pulper. In one embodiment of the invention the intermediate residence entity is a pulper for pulp or broke. At least one fibre suspension flow is normally fed into the intermediate residence entity, such as storage tower or tank or the like, in its upper part and it is discharged from the lower part of the intermediate residence entity via an outlet. The residence time is understood as the time, which lapses between the entry of the fibre suspension into the residence entity and the discharge of the fibre suspension from the intermediate residence entity. The residence time for intermediate residence entities which operate under continuous feed and discharge can be calculated in a manner known as such. The residence time may be, for example, at least 4 h, preferably at least 5 h, sometimes even at least 6 h. Prolonged residence times are typically encountered during planned or unplanned process stops. According to one preferable embodiment the germinant surfactant or the treatment system containing it is added to the fibre suspension when fibre suspension's residence time in the intermediate residence entity has exceeded 2 hours.

The addition point of the germinant surfactant may be located at the lower part of the intermediate residence entity. The term "lower part of the intermediate residence entity" denotes here the part of the intermediate residence entity that is located under the horizontal line that divides the residence entity into two parts of equal height, draw between the bottom and the upper end of the intermediate residence entity. The addition point of the germinant surfactant is preferably located at the mixing zone of the intermediate residence entity at the lower part of the intermediate residence entity.

Alternatively, or in addition, the germinant surfactant may be added at or after the outlet of the intermediate residence entity, but before the formation of the fibrous web. Preferably the germinant surfactant is added at or after the outlet of the intermediate residence entity.

According to one embodiment of the invention the time delay between the addition of the germinant surfactant and the formation of the fibrous web may be less than 60 min, preferably less than 45 min, more preferably less than 30 min. Preferably the time delay is at least 15 min, but it is possible that in certain embodiments the time delay may be less than 15 minutes, even less than 10 minutes. The intermediate residence entity may be, for example in this case, the storage tower or the last broke tower. The relatively short time delay between the addition of the germinant surfactant and the web formation makes it possible to add the germinant surfactant close to the headbox of a paper or board machine. This means that for example after a production stop the germinant surfactant can be added after the intermediate residence entity, and the possible detrimental endospore formation in the intermediate residence entity during the stop can be alleviated.

According to one embodiment of the invention the germinant surfactant is added to the fibre suspension at or after the outlet of an intermediate residence entity, which is followed by one or more intermediate residence entities. For example, the germinant surfactant is added to the fibre suspension at or after the outlet of a pulper for pulp or broke or the outlet of the first broke tower in series of broke towers. The fibre suspension is transferred from the outlet to a following intermediate residence entity. The residence time in the following intermediate residence entities is preferably at maximum 2 hours in each. According to this embodiment, when there is at least one intermediate residence entity between the addition point and the formation of the fibrous web, the time delay between the addition of the germinant surfactant and the formation of the fibrous web may be at least 15 min, preferably at least 30 min, more preferably at least 45 min, even more preferably at least 60 min and less than 8 hours. It is possible that at least one biocidal agent, as defined elsewhere in this context, may be added to the fibre suspension between the first and the successive intermediate residence entity/entities, for reducing and/or destroying the sensitised endospores.

According to one embodiment the fibre suspension is diluted from a first concentration, usually storage concentration, to a second concentration with dilution water. The fibre suspension may be diluted from high concentration of >6 weight-%, sometimes>10 weigh-%, to a second low concentration of <4 weight-%, preferably <1 weigh-%. Often the first concentration may be in the range of 4-10 weight-%, quite often 6-8 weight-%. The germinant surfactant may be added to the fibre suspension either before or after the dilution, and it is shows good effect in sensitising endospores both in high and low fibre suspension concentrations. According to one embodiment the germinant surfactant is added to fibre suspension, which has a concentration in the range of 0.1-6 weight-%, preferably 0.1-4 weight-%, more preferably 0.1-2 weight-%, even more preferably 0.1-1.5 weight-%. It has been observed that the addition of the germinant surfactant to fibre suspension with a low concentration provides an effective mixing of the germinant surfactant to the fibre suspension while producing active sensitisation of the bacterial endospores. On the other hand the addition of the germinant surfactant to fibre suspension with a high concentration provides advantages in view of process economy.

According to one embodiment the germinant surfactant is added to the fibre suspension together with the dilution water in order to ensure the proper mixing of the germinant surfactant throughout the fibre suspension.

According to one embodiment of the invention the amount of bacterial endospores, given as CFU/ml, in the fibre suspension is reduced at least 20%, preferably at least 40%, sometimes even at least 50%, between the outlet of the intermediate residence entity and the formation of the fibrous web.

After the initial formation of the fibrous web the web is dried in a drying section of a pulp, paper, board or tissue machine. The temperature in the drying section is typically at least 100° C., preferably at least 110° C., more preferably at least 120° C., and the fibrous web is preferably subjected to this temperature for at least 0.3 min, more preferably for at least 0.5 min, preferably for at least 1 min in the drying section. According to one preferable embodiment the formed fibrous web is dried at a temperature of >90° C. and the sensitised bacterial endospores, such as germinated or partially germinated bacterial endospores, are destroyed and killed. The exposure to heat energy thus provides the final effective destruction of sensitised endospores. The bacterial endospore content in the dried web may be ≤1000 CFU/g, preferably ≤500 CFU/g, more preferably ≤250 CFU/g.

According to one embodiment of the invention at least one biocidal agent may be added to the fibre suspension, before and/or after the addition of the germinant surfactant. The at least one biocidal agent is different from germinant surfactant. According to one preferable embodiment at least one biocidal agent is added preferably prior to addition of the germinant surfactant. It is also possible to add the germinant surfactant to the fibre suspension simultaneously but preferably separately with the biocidal agent. Use of the treatment system that comprises germinant surfactant and biocidal agent(s) provide advantageous effect, where a reduction both in amounts of vegetative bacteria and endospores is significantly higher than the reduction achievable by biocidal agent(s) or germinant surfactant alone.

It is possible to add one or several different biocidal agents to the fibre suspension, either before and/or after the addition of the germinant surfactant. In case of several different biocidal agents, it is possible to add first biocidal agent(s) before the addition of the germinant surfactant and second biocidal agent(s) after the addition of the germinant surfactant. This provides great flexibility for the dosing of various biocidal agents and possibilities to obtain an optimal control of bacteria and endospores.

Biocidal agent, which may be added to the fibre suspension, preferably prior to the germinant surfactant addition, may be oxidizing biocide, which is preferably selected from chlorine; alkali and alkaline earth hypochlorite salts; hypochlorous acid; chlorinated isocyanurates; bromine; alkali and alkaline earth hypobromite salts; hypobromous acid; bromine chloride; chlorine dioxide; ozone; hydrogen peroxide; peroxy compounds, such as performic acid, peracetic acid, percarbonate or persulfate; halogenated hydantoins, such as monohalodimethylhydantoins; dihalodimethylhydantoins; perhalogenated hydantoins; monochloramines; monobromamines; dihaloamines; trihaloamines; urea reacted with an oxidant, the oxidant being e.g. alkali and alkaline earth hypochlorite salts or alkali and alkaline earth hypobromite salts; ammonium salts, e.g. ammonium bromide or ammonium sulphate, reacted with an oxidant, the oxidant being preferably alkali and alkaline earth hypochlorite salts or alkali and alkaline earth hypobromite salts; or any combination thereof. Alkali and alkaline earth hypochlorite salts, such as sodium hypochlorite, are being preferred as oxidizing biocide.

Alternatively the biocidal agent, which may be added to the fibre suspension, preferably prior to the germinant surfactant addition, may be non-oxidizing biocide, which is preferably selected from glutaraldehyde; 2,2-dibromo-3-nitrilopropionamide (DBNPA); 2-bromo-2-nitropropane-1,3-diol (Bronopol); quaternary ammonium compounds (quats), such as n-alkyl dimethyl benzyl ammonium chloride, didecyl dimethyl ammonium chloride (DDAC) or alkenyl dimethyl ammonium chloride; carbamates; 5-chloro-2-methyl-4-isothiazolin-3-one (OMIT); 2-methyl-4-isothiazolin-3-one (MIT); 1,2-dibromo-2,4-dicyanobutane, bis(trichloromethyl)sulfone; 2-bromo-2-nitrostyrene; 4,5-dichloro-1,2-dithiol-3-one; 2-n-octyl-4-isothiazolin-3-one; 1,2-benzisothiazolin-3-one; ortho-phthaldehyde; other guanidines than dodecylguanidine salts, biguanidines, pyrithiones; 3-iodo-propynyl-N-butylcarbamate; phosphonium salts, such as tetrakis hydroxymethyl phosphonium sulfate (THPS); dazomet; 2-(thiocyanomethylthio) benzothiazole; methylene bisthiocyanate (MBT); or any combination thereof.

According to one preferable embodiment it is possible to add both oxidative and non-oxidative biocides to the fibre suspension, before and/or after the addition of germinant surfactant or simultaneously with the germinant surfactant. The treatment system comprises biocidal agent, which may be selected from oxidative and non-oxidative biocide, and combinations thereof. The treatment system may thus comprise a plurality of different biocidal agents, which may be oxidative and/or non-oxidative biocides. According to one embodiment the germinant surfactant and biocidal agent(s) are used sequentially, preferably by adding biocidal agent(s) before the germinant surfactant.

Biocidal agent(s), which are used with the germinant surfactant or as a part of the treatment system may be used in dosages which are conventional in the art. In some embodiment it is possible to use lower dosages of biocidal agent(s) after the germinant surfactant has sensitised the bacterial endospores, disrupted their protective structures and made them more sensitive for biocidal agent(s). At least one active halogen containing biocidal agent may be added to the fibre suspension in amount of 1-10 ppm, preferably 2-8 ppm, more preferably 3-5 ppm, given as active halogen.

The temperature of the fibre suspension during the addition of the germinant surfactant may be at least +20° C., preferably +40-+70° C. It has been observed that the elevated temperature of the fibre suspension may improve the sensitisation effect obtainable by the germinant surfactant, or at least does not have any negative influence on the effect obtainable with the germinant surfactant.

The pH of the pulp suspension is preferably in the pH range of 4-12 in order to guarantee the optimal interaction of the germinant surfactant and vegetative bacteria and/or germinant surfactant and the bacterial endospores. The addition of the germinant surfactant at dosage level that provides a decrease in the endospore amount does not significantly change pH of the fibre suspension. The pH change of the fibre suspension is less than 0.5 pH units, preferably less than 0.25 pH units, more preferably less than 0.1 pH units, measured after the addition of the germinant surfactant. This is advantageous because stable pH of the fibre suspension minimises the disturbance for other chemical systems used in or added to the fibre suspension.

The pulp suspension treated with the germinant surfactant may be formed into a fibrous web of paper, board or tissue and dried. The method according to the present invention is especially suitable for producing a hygienic fibrous web, such as hygienic web of paper, board, tissue or the like. In the present context the term "hygienic fibrous web" encompasses fibrous webs comprising cellulosic fibres, where bacterial endospore content in the dried web is less than about 1000 CFU/g, preferably less than about 500 CFU/g, more preferably less than about 250 CFU/g. The endospore content is preferably ≤1000 CFU/g, preferably ≤500 CFU/g, more preferably ≤250 CFU/g. According to one embodiment the hygienic fibrous web has a bacterial endospore content in the dried web<100 CFU/g, preferably <75 CFU/g, more preferably 50 CFU/g.

The fibre suspension comprises lignocellulosic and/or cellulosic fibres, optional papermaking additives and water. The fibre suspension may comprise, alternatively or in addition, microfibrillated cellulose. In this context lignocellulosic fibres are fibres originating from wood, for example from softwood or hardwood. The lignocellulosic/cellulosic fibres may be virgin fibres obtained by any known pulping process and/or they may be recycled fibres and/or they may originate from broke. For example, the fibre stock may comprise cellulosic fibres obtained by mechanical pulping, chemical pulping, chemithermomechanical pulping or by repulping recycled or recovered fibres. The lignocellulosic/cellulosic fibres can be refined or unrefined, bleached or unbleached. The lignocellulosic/cellulosic fibres may be recycled unbleached or bleached Kraft pulp fibres, hardwood semi-chemical pulp fibres, grass pulp fibres or any mixtures thereof.

EXPERIMENTAL

Some embodiments of the invention are described in the following non-limiting examples.

Example 1

Objective of this laboratory test was to study bacterial killing and spore sensitisation effect of a germinant surfactant composition comprising 35 weight-% of dodecylguanidine hydrochloride (DGH) and dipropyleneglycol as solvent in paper machine process water, at variable pulp consistency.

Authentic circulation water, with low fibre content, and authentic broke, with high fibre content, were collected from a paper machine, which produced food packaging board. Circulation water and broke samples were mixed together to obtain 6 samples in total, at 3 different pulp consistency levels.

To obtain equal bacterial spore content in the samples at the start of the experiment, each sample was spiked with additional bacterial spores. Target spore level in the sample was set to ca. 10 000 CFU/ml. The spore solution for spiking was prepared as follows: authentic spore-forming bacteria that were isolated from a paper making process were pre-grown for 2 days at +37° C. in a modified nutrient broth, after which the mature spores were harvested, and washed by using centrifugation and cold water.

Out of the 6 samples, 3 test samples were treated with germinant surfactant comprising dodecylguanidine hydrochloride (DGH) and 3 samples were left without any chemical addition as reference samples. After addition of germinant surfactant, the test samples as well as the reference samples (no addition) were stored at 45° C., mixing of 180 rpm, for 30 minutes, followed by quantification of total aerobic bacteria (non-pasteurized samples) and aerobic spores (plate count agar, +32° C., 2 days incubation). Prior to the aerobic spore determination, samples were pasteurized at +82° C. for 10 min. Weight of suspended solids per litre of liquid, i.e. pulp consistency, was determined at the end of the test (dry weight of sample per total weight of sample). Results of are shown in Table 1.

TABLE 1

Results of Example 1

| Pulp consistency (w/w-%) | DGH content (mg/L as active) | Aerobic spores, cfu/ml (+82° C., 10 min, +32° C., 2 d PCA) | Spore reduction (%) | Total aerobic bacteria (+32° C., 2 d PCA) | Bacterial killing efficacy (%) |
|---|---|---|---|---|---|
| 0.1 | 0 | 20 000 | 98 | 300 000 | 100 |
|  | 100 | 400 |  | 300 |  |
| 3 | 0 | 5 400 | 87 | 40 000 | 78 |
|  | 100 | 700 |  | 9 000 |  |
| 6 | 0 | 5 100 | 45 | 170 000 | 55 |
|  | 100 | 2 800 |  | 77 000 |  |

Results in Table 1 show that germinant surfactant comprising DGH-biocide, at dosage 100 mg/l as active component, showed excellent bacterial killing (100%) and spore reduction (98%) effect in low 0.1% consistency sample. Similarly, good bacterial killing (78%) and spore reduction (87%) effects were obtained in 3 w-% consistency sample. In the sample having highest 6% consistency, the bacterial killing (55%) and spore reduction efficacy (45%) of the germinant surfactant were somewhat lower than in the other samples but still significant effect could be observed.

Obtained results indicate that a germinant surfactant comprising DGH may effectively be used to hygienise spore contaminated process streams with different pulp consistencies. It thus provides a novel tool for reduction of bacterial spores in both low and thick pulp stock, such as dilute and thick broke towers. Such a hygienisation treatment, i.e. spore reduction of >45%, eventually helps the mills to meet strict hygiene limits set for food packaging board production.

Example 2

Authentic broke and circulation water samples were collected from an alkaline paper mill producing food packaging board. 1 litre of broke was stored for 2 days, +45° C., with closed cap, without mixing, in order to induce anaerobism and thus bacterial sporulation. This stagnant sample was divided to four 100 ml samples, out of which two replicate samples were treated with a germinant surfactant comprising 35 weight-% dodecylguanidine hydrochloride (DGH) and dipropyleneglycol as solvent. The dosage was 70 mg/L as active DGH. Two replicates were left without any chemical additions as reference samples.

After chemical contact time of 5 min, all samples were diluted three times with the circulation water and incubated for 30 minutes, at +45° C., mixing of 160 rpm. Total aerobes (PCA, +37° C.) and aerobic spores (PCA, +37° C.) were measured at start from reference samples and after the total contact time of 35 min from all samples. Results are shown in FIG. 1.

In FIG. 1:
A=fresh broke at start, no DGH
B=Stagnant 2 d old broke, no DGH
C=Stagnant 2 d old broke mixed with dilution water, no DGH
D=Stagnant 2 d old broke treated with DGH ad 70 ppm (as active) for 5 min, and mixed with dilution water FIG. 1 shows for reference samples that fresh broke contained a large amount, $1.6 \times 10^7$ CFU/ml, of total aerobic bacteria, but little, 14 CFU/ml, aerobic spores. After 2 days of "stagnant" storage at +45° C., the aerobic spore count of broke markedly increased from 14 CFU/ml to 500 CFU/ml, and total aerobes level remained at high level, $9.3 \times 10^6$ CFU/ml. Due to addition of the dilution water, which was circulation water with 26 spores/ml, aerobic spore count decreased from 500 CFU/ml to 330 CFU/ml.

When the stagnant and diluted broke was treated with germinant surfactant comprising DGH, at dosage of 70 mg/l active, the level of aerobic spores decreased from 330 CFU/ml to 120 CFU/ml, and total aerobic bacteria level decreased slightly from $9 \times 10^6$ CFU/ml to $2 \times 10^6$. Obtained results thus indicate that the germinant surfactant comprising DGH may be used at economically feasible treatment level for effective broke hygienisation, i.e. for spore reduction of >60%, which is a significant improvement for hygienic paper or board production, and killing of aerobic bacteria, in conditions that correspond to authentic processing of broke at food packaging board mills. Germinant surfactant comprising DGH thus provides a unique spore control solution for hygienic board production.

Example 3

Objective of this laboratory test was to study effect of biocidal pre-treatment on bacterial killing and spore sensitisation efficacy of a germinant surfactant comprising 35 weight-% of dodecylguanidine hydrochloride (DGH) and dipropyleneglycol as solvent in paper machine process water.

Authentic circulation water (1 litre) was collected from a paper machine producing food packaging board and divided into 4 samples with volume of 50 ml. To obtain equal bacterial spore content in the samples at start of the experiment, each sample was spiked with additional bacterial spores. The target level for spores was c.a. 10 000 CFU/ml. The spore solution for spiking was prepared as follows: authentic spore-forming bacteria that were isolated from a paper making process were pre-grown for 2 days at +37° C. in modified nutrient broth, after which the mature spores were harvested, and washed by using centrifugation and cold water. Out of the 4 samples,
- the first sample was left without any chemical addition as a reference sample.
- the second sample was treated with sodium hypochlorite, at dosage of 5 mg/l, given as active chlorine;
- the third sample was treated with a germinant surfactant comprising dodecylguanidine hydrochloride (DGH), at dosage level of 100 mg/l, given as active compound; and
- the fourth sample was treated with sodium hypochlorite, at dosage of 5 mg/l, given as active chlorine) for 1 minute, after which the third sample was treated with a germinant surfactant comprising dodecylguanidine hydrochloride (DGH), at dosage level of 100 mg/l, given as active compound;

Samples were stored at 45° C., under mixing of 180 rpm, for 30 minutes except samples 2 and 4, which were in addition pre-treated with sodium hypochlorite for 1 minute. After the treatment the amount of total aerobic bacteria (non-pasteurized samples) and aerobic spores were quantified (plate count agar, +32° C., 2 days incubation). Prior to the aerobic spore determination, samples were pasteurized at +82° C. for 10 min. Results of are shown in Table 2

TABLE 2

Results of Example 3.

| Sample | Total aerobic bacteria PCA +32, 30 min @45° C. | Aerobic spores PCA +32 30 min @45° C. | pH | Redox |
|---|---|---|---|---|
| 1. Process water, no biocides | 7 000 000 | 13 000 | 7.6 | 165 |
| 2. Process water with sodium hypochlorite as 5 ppm (as active Chlorine) | 320 000 | 17 000 | 7.7 | 154 |
| 3. Process water with DGH as 100 ppm (as active) | 10 000 | 3 000 | 7.6 | 166 |

TABLE 2-continued

Results of Example 3.

| Sample | Total aerobic bacteria PCA +32, 30 min @45° C. | Aerobic spores PCA +32 30 min @45° C. | pH | Redox |
|---|---|---|---|---|
| 4. Process water, with sodium hypochlorite as 5 ppm (as act Cl) pre-treatment (1 min), followed by DGH treatment as 100 ppm (as active) | 4 700 | 900 | 7.7 | 147 |

Results in Table 3 show that sodium hypochlorite showed good killing effect against total aerobic bacteria, whereby the level decreased from 7 000 000 CFU/ml to 32 000 CFU/ml, but it did not have any effect on bacterial spores, as the spore counts were at 17 000 CFU/ml level despite the chlorine treatment.

Germinant surfactant comprising DGH showed alone an excellent bacterial killing effect, as the total aerobic bacteria level decreased from 7 000 000 CFU/ml to 10 000 CFU/ml, and also good spore sensitisation effect, as the aerobic spore count decreased from 13 000 to 3000 CFU/ml, i.e. spore reduction of >70%, which is a significant improvement for hygienic paper or board production. The most effective killing and spore reduction effect was obtained with sodium hypochlorite as pre-treatment, followed by treatment with germinant surfactant comprising DGH. This dual biocide treatment, which did not change process pH nor ORP, caused a drastic drop in total aerobic bacteria level from 7 000 000 CFU/ml to 4 700 CFU/ml and in bacterial spore count from 13 000 CFU/ml to 900 CFU/ml, i.e. spore reduction of >90%, which is a significant improvement in hygienic paper or board production. Obtained results indicate clearly that fast acting biocides, such as sodium hypochlorite, may preferably be used as a pre-treatment before dosage of germinant surfactant comprising DGH for spore reduction purposes. Germinant surfactant comprising DGH together with sodium hypochlorite pre-treatment provides a novel tool for easy and quick reduction of bacterial spores, such as spore reduction>90%, in pulp and paper process streams which eventually helps food packaging board mills to meet strict hygiene limits of final board.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for manufacturing a fibrous web, the method comprising:
   (a) obtaining at least one fibre suspension of lignocellulosic and/or cellulosic fibres,
   (b) feeding the fibre suspension into an intermediate residence entity,
   (c) discharging the fibre suspension, which comprises bacterial endospores, out of the intermediate residence entity via an outlet after a residence time of at least 2 hours in the intermediate residence entity,
   (d) forming after a time delay the fibre suspension into a fibrous web, wherein
   the bacterial endospores are sensitized by adding a germinant surfactant, which comprises a primary or a secondary ammonium head group and a linear unsubstituted C12-alkyl tail, to the fibre suspension at an addition point, which is located at a lower part of the intermediate residence entity or after the outlet of the intermediate residence entity, but before the formation of the fibrous web.

2. The method according to claim 1, further comprising diluting the fibre suspension from a first concentration to a second concentration with dilution water, whereby the germinant surfactant is added to the fibre suspension together with the dilution water.

3. The method according to claim 1, wherein the germinant surfactant is selected from n-dodecylamine or n-dodecylguanidine, dodecylamine salt or dodecylguanidine salt, or any of their mixture.

4. The method according to claim 3, wherein the dodecylguanidine salt is dodecylguanidine hydrochloride.

5. The method according to claim 1, wherein the time delay between the addition of the germinant surfactant and the formation of the fibrous web is less than 60 min.

6. The method according to claim 5, wherein the time delay between the addition of the germinant surfactant and the formation of the fibrous web is less than 45 min.

7. The method according to claim 5, wherein the time delay between the addition of the germinant surfactant and the formation of the fibrous web is less than 30 min.

8. The method according to claim 1, wherein the time delay between the addition of the germinant surfactant and the formation of the fibrous web is at least 15 min, and less than 8 hours, when there is at least one intermediate residence entity between the addition point and the fibrous web formation.

9. The method according to claim 8, wherein the time delay between the addition of the germinant surfactant and the formation of the fibrous web is at least 30 min.

10. The method according to claim 1, wherein adding the germinant surfactant is in an amount of >30 ppm, given as active surfactant.

11. The method according to claim 10, wherein adding the germinant surfactant is in an amount of 60-200 ppm, given as active surfactant.

12. The method according to claim 10, wherein adding the germinant surfactant is in an amount of 70-100 ppm, given as active surfactant.

13. The method according to claim 1, further comprising drying the formed fibrous web at a temperature of >90° C. and destroying the sensitized bacterial endospores.

14. The method according to claim 13, wherein the bacterial endospore content in the dried web is ≤1000 CFU/g.

15. The method according to claim 14, wherein the bacterial endospore content in the dried web is ≤500 CFU/g.

16. The method according to claim 14, wherein the bacterial endospore content in the dried web is ≤250 CFU/g.

17. The method according to claim 1, wherein the amount of bacterial endospores, given as CFU/ml, in the fibre suspension is reduced at least 20% between the outlet of the intermediate residence entity and the formation of the fibrous web.

18. The method according to claim 17, wherein the amount of bacterial endospores, given as CFU/ml, in the fibre suspension is reduced at least 40%.

19. The method according to claim 1, further comprising adding at least one biocidal agent to the fibre suspension.

20. The method according to claim 19, wherein the at least one biocidal agent is non-oxidizing biocide, which is selected from glutaraldehyde; 2,2-dibromo-3-nitrilopropionamide (DBNPA); 2-bromo-2-nitropropane-1,3-diol (Bronopol); quaternary ammonium compounds (quats); carbamates; 5-chloro-2-methyl-4-isothiazolin-3-one (CMIT); 2-methyl-4-isothiazolin-3-one (MIT); 1,2-dibromo-2,4-dicyanobutane; bis(trichloromethyl)sulfone; 2-bromo-2-nitrostyrene; 4,5-dichloro-1,2-dithiol-3-one; 2-n-octyl-4-isothiazolin-3-one; 1,2-benzisothiazolin-3-one; orthophthaldehyde; other guanidines than dodecylguanidine salts, biguanidines, pyrithiones; 3-iodo-propynyl-N-butylcarbamate; phosphonium salts; dazomet; 2-(thiocyanomethylthio) benzothiazole; methylene bisthiocyanate (MBT); or any combination thereof.

21. Method according to claim 20, wherein the quaternary ammonium compound is selected from n-alkyl dimethyl benzyl ammonium chloride, didecyl dimethyl ammonium chloride (DDAC) or alkenyl dimethyl ammonium chloride.

22. The method according to claim 19, wherein the germinant surfactant and biocidal agent(s) are used sequentially.

23. The method according to claim 22, wherein the biocidal agent(s) is/are added before the germinant surfactant.

24. The method according to claim 19, wherein the at least one biocidal agent is an oxidizing biocide, which is selected from chlorine; alkali and alkaline earth hypochlorite salts; hypochlorous acid; chlorinated isocyanurates; bromine; alkali and alkaline earth hypobromite salts; hypobromous acid; bromine chloride; chlorine dioxide; ozone; hydrogen peroxide; peroxy compounds; halogenated hydantoins; monochloramines; monobromamines; dihaloamines; trihaloamines; urea reacted with an oxidant, ammonium salts, reacted with an oxidant; or any combination thereof.

25. Method according to claim 24, wherein the peroxy compound is selected from performic acid, peracetic acid, percarbonate or persulfate.

26. Method according to claim 24, wherein the halogenated hydantoin is selected from monohalodimethylhydantoins and dihalodimethylhydantoins.

27. Method according to claim 24, wherein the ammonium salt reacted with oxidant is selected from ammonium bromide or ammonium sulfate.

28. Method according to claim 24, wherein the oxidant is selected from alkali and alkaline earth hypochlorite salts or alkali and alkaline earth hypobromite salts.

29. The method according to claim 1, further comprising adding at least one active halogen containing biocidal agent to the fibre suspension in an amount of 1-10 ppm, given as active halogen.

30. The method according to claim 1, wherein the fibrous web is a web of paper, board or tissue and the intermediate residence entity is a pulper, a storage tower or a broke tower.

* * * * *